No. 870,727. PATENTED NOV. 12, 1907.
G. M. KNEUPER.
METHOD OF CLEANING FILTERS.
APPLICATION FILED JUNE 1, 1906.
2 SHEETS—SHEET 1.
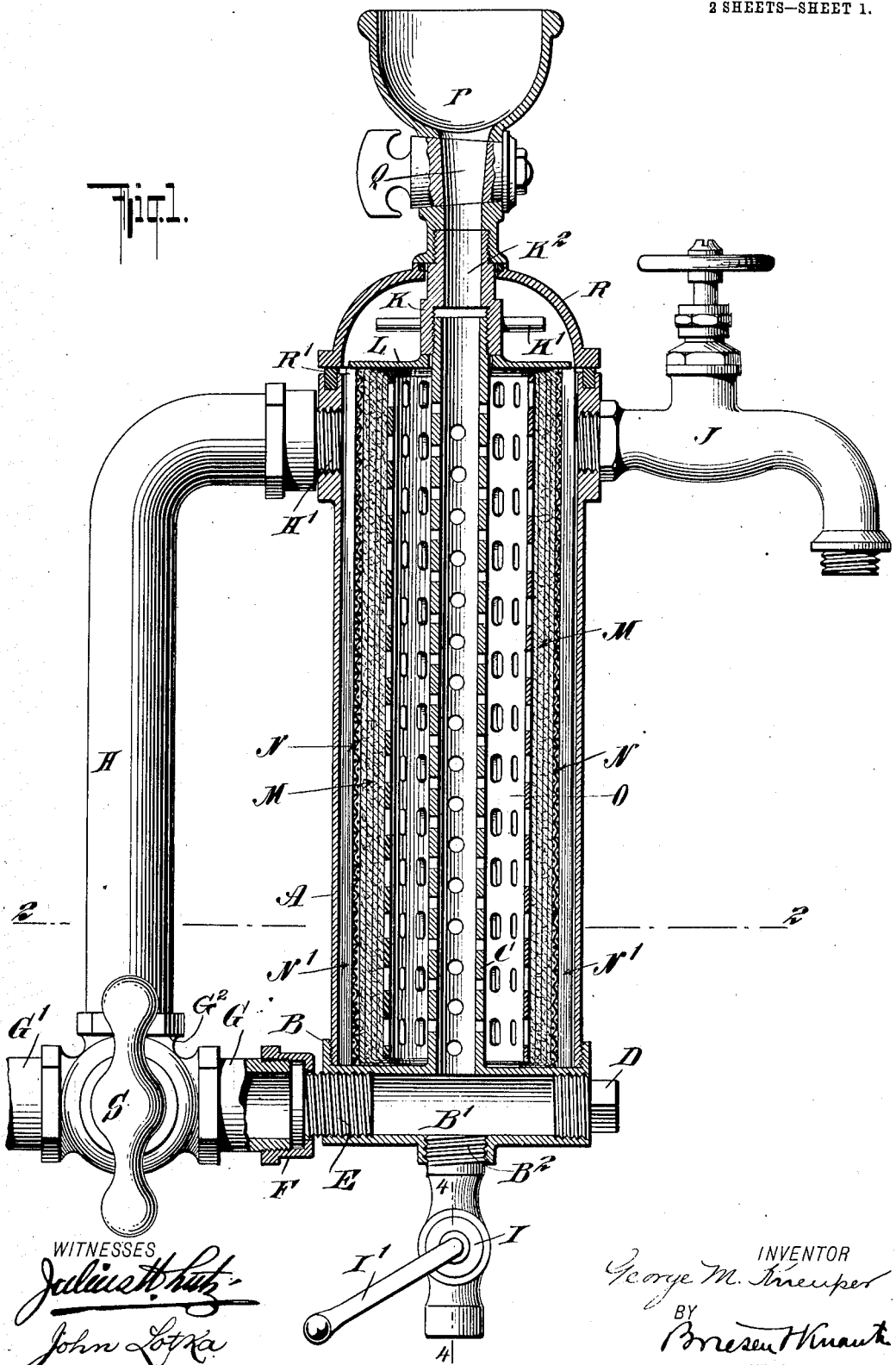

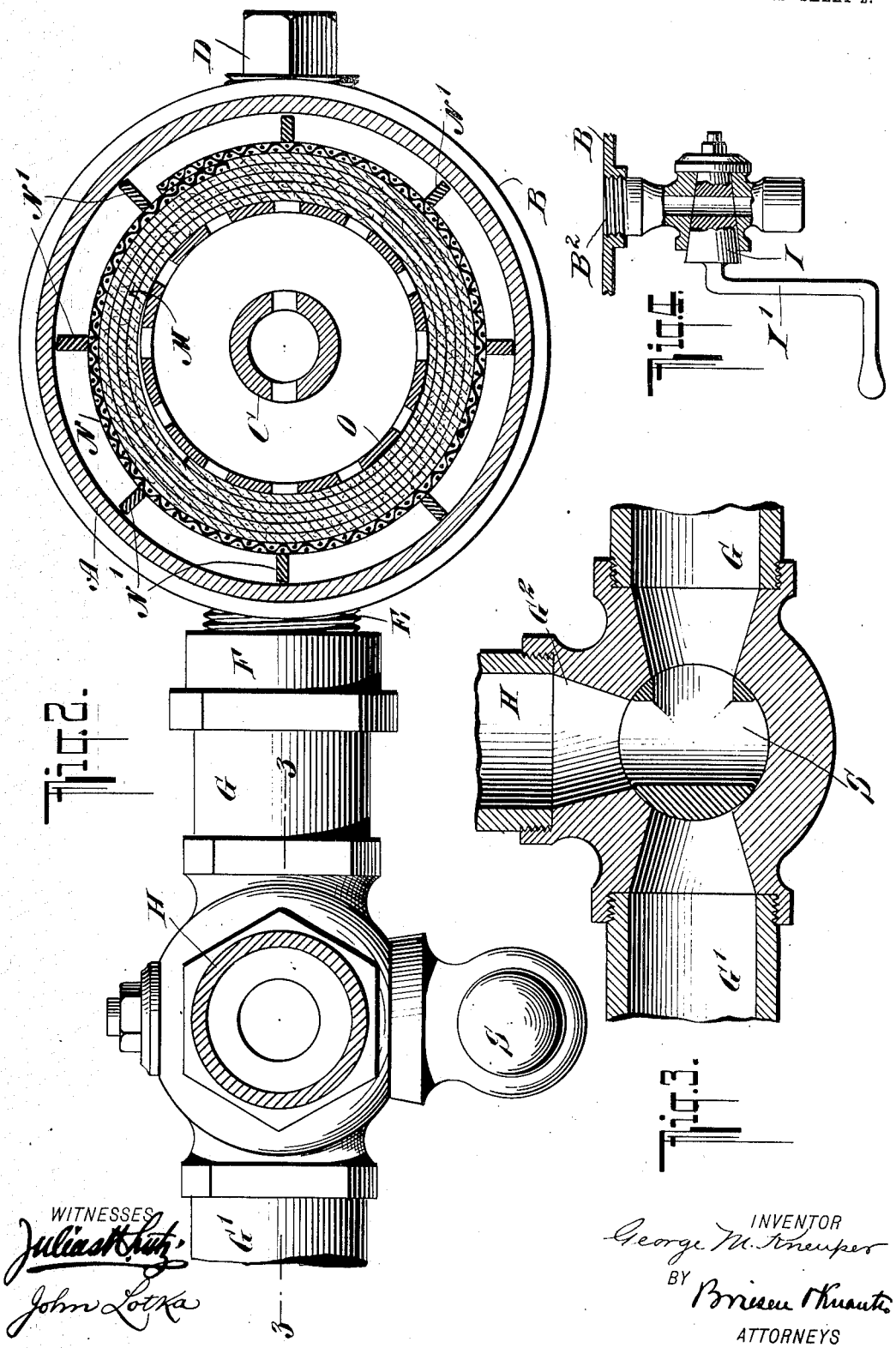

UNITED STATES PATENT OFFICE.

GEORGE M. KNEUPER, OF NEW YORK, N. Y., ASSIGNOR OF ONE-THIRD TO GEORGE KNEUPER AND ONE-THIRD TO KATE KNEUPER.

METHOD OF CLEANING FILTERS.

No. 870,727.  Specification of Letters Patent.  Patented Nov. 12, 1907.

Application filed June 1, 1906. Serial No. 319,673.

*To all whom it may concern:*

Be it known that I, GEORGE M. KNEUPER, a citizen of the United States, and a resident of the borough of Brooklyn, county of Kings, city and State of New York, have invented certain new and useful Improvements in Methods of Cleaning Filters, of which the following is a specification.

My invention has for its object the removal of sediments, slimes or deposits which are liable to clog up filters and render them inoperative. In order to loosen and carry away said impurities or obstructions, I send through the filter a current of water or other fluid varying in strength so as to subject the filter to a shaking action as it were.

The particular manner in which I prefer to carry out my invention will now be described with reference to the accompanying drawings, and the novel features of my invention will be pointed out in the appended claims.

Figure 1 is a vertical section through a filter fitted with means for cleaning it according to my invention; Fig. 2 is a cross-section on line 2—2 of Fig. 1 drawn upon an enlarged scale; Fig. 3 is a vertical section of line 3—3 of Fig. 2, and Fig. 4 is a side elevation with parts in section on line 4—4 of Fig. 1.

I will briefly describe the filter shown which embodies certain inventions or improvements of mine forming the subject matter of another application for patent filed concurrently herewith Serial No. 319674.
A is a cylindrical shell screwed at the bottom into a bottom member B from which rises at the center the perforated pipe C which communicates with the passage B' of the bottom member. The said passage is closed at one end by a screw plug D which can be removed when it is desired to clean said passage, and at the other end is located an axially perforated screw E connected by means of a clamping nut F with one end of a valve casing G. At G' this valve casing is connected with a supply pipe such as the water-main, and at G² with a pipe H leading to the inlet H' at the upper end of the shell A. At the lower end of the apparatus is located an outlet B² controlled by a valve I which may be rotated by means of a crank I'. The upper end of the casing is also provided with a suitable outlet such as a common faucet J.

The upper end of the pipe C is screw-threaded and receives a nut K which is adapted to press down a top plate L arranged to clamp from above the filtering material M and a layer of wire netting N which is wrapped around said filtering material. The filtering material may be a sheet of pulp or cotton or any suitable substance. When a sheet is used it is wrapped on a perforated tube O, the ends of the sheet being bent inward over the edges of said tube so that a tight joint will be formed. The nut K is provided with a handle K' to facilitate its manipulation, and is also provided with a longitudinal channel K² which communicates with the outlet of a receptacle or cup P screwed upon the upper end of the nut, and having a cock Q controlling the communication of said cup with the channel K². The lower end of the cup also serves as a clamp to press down a cap R pressing down on a washer R' located at the upper edge of the shell A. In order to space the layer N of wire netting, or other perforated material from the inner wall of the filter casing, longitudinal ribs N' are provided on the outside of said layer in engagement with the inner wall of the shell A.

The connection of the supply pipe G' with either the pipe H or the passage B' in the bottom of the filter is controlled by a three-way cock S which in one position, as shown in Fig. 3, disconnects the supply pipe from the filter, while in its second position it will connect said supply pipe with the pipe H, and in its third position it will connect said supply pipe with the bottom passage B'.

In the normal operation of the filter, the cock Q will be closed, as will also the valve I. The three-way cock S will be turned to connect the supply pipe G' with the bottom passage B'. The water or other liquid to be filtered will travel upward into the pipe C, and travel through the perforations thereof and through the pipe O to the filtering material M, after passing through which the filtered liquid will issue through the outlet J when the same is opened. It will be obvious that the deposits due to filtration will form chiefly on the inner surface of the filtering material M. Now in order to dislodge these deposits I send a pulsating current through the filter, that is a current varying in strength, and in the particular embodiment of my invention shown herein the force of the current varies from a maximum to naught, although this is not absolutely necessary. To accomplish this result the faucet J will be closed and the three-way cock S so turned as to connect the supply pipe G' with the pipe H. Water will then flow through the filter in the opposite direction, and of course pure water should be used for this cleaning operation. If now the outlet cock I should be opened, the sediments would be partly washed out through the opening, but very soon the liquid will become clear showing that the water passes through the filter without any cleaning action. If then, however, the crank I' is revolved so as to alternately open and close the outlet, and thus produce a pulsating and specifically an intermittent current, it will be observed that the stream of water which hitherto was quite clear becomes turbid again, thus clearly showing that the pulsating action of the current has much greater efficiency to clean the filter than the mere reversed flow of the liquid.

I have found that it is most efficient to produce the pulsation by periodically obstructing the outlet, either partly or entirely, as in this case the back pressure created by the closing or obstructing of the outlet has a beneficial action by producing what is known as a hammer-blow, that is a shock which tends to loosen the particles of sediment.

The cup P is used for introducing into the central space of the filter a powdered substance or other matter before filtration, and then, when the substance to be filtered is turned on, the powdered substance will be thrown and deposited on the inner surface of the filtering material M, thus producing a filtering surface of increased efficiency. This feature of my invention, which is not claimed herein, is more fully described in the companion application hereinbefore referred to. The hereinbefore described pulsating current may also be employed for the removing of this additional filtering substance from the filtering material M when it is no longer desired to use this filtering substance, and I desire it to be understood that the term "cleaning" as used in the appended claims, is to be interpreted as including such removal of an additional filtering substance.

The screw plug D may be taken out when it is desired to filter a fluid other than the water from the mains; such fluid would then be admitted through the opening normally closed by the plug D, the cock S remaining closed. Otherwise the operation will be the same as above described.

I claim:

1. The method of cleaning filters, which consists in sending therethrough a current of a washing liqui'' in the direction opposite to that in which the filtration was effected, and periodically obstructing the outlet to give said current a pulsating action.

2. The method of cleaning filters, which consists in sending therethrough a current of a washing liquid in the direction opposite to that in which the filtration was effected, and alternately opening and closing the outlet to give said current an intermittent action.

In testimony whereof, I have hereunto signed my name in the presence of two subscribing witnesses.

GEORGE M. KNEUPER.

Witnesses:
  JOHN LOTKA,
  JOHN A. KEHLENBECK.